July 31, 1962     W. S. AUSHERMAN     3,047,834

CABLE CONNECTOR

Filed July 5, 1961

*INVENTOR.*
WILLIAM S. AUSHERMAN
BY *Robert E Breidenthal*

*ATTORNEY*

United States Patent Office 3,047,834
Patented July 31, 1962

3,047,834
CABLE CONNECTOR
William S. Ausherman, 3500 N. Topeka, Wichita, Kans.
Filed July 5, 1961, Ser. No. 122,000
9 Claims. (Cl. 339—236)

The present invention relates to new and useful improvements in connectors for battery cables, and more specifically pertains to connectors that can be releasably secured to the opposite ends of a battery cable and which are adapted respectively for detachable mechanical and electrical connection to a battery terminal and the frame of a vehicle as is useful in the electrical systems of vehicles.

The present invention is related to the invention disclosed in my copending patent application filed April 12, 1961, bearing Serial Number 102,605 and entitled "Battery Terminal Connector." Generally speaking, the present invention includes as objectives and purposes those set forth in my pending application.

The principal object of the present invention is to provide rugged and inexpensive connectors adapted to make reliable mechanical and electrical connections for a battery cable to a battery terminal as well as to the frame of a vehicle, and which connectors can be readily connected as well as readily disconnected without damage to either the connectors or to the parts to which they are connected.

Another important ooject of the present invention is to provide a connector for a cable to a battery terminal post which is adapted to force the conductors of the battery cable into direct physical and electrical contact with the battery terminal post thereby strengthening the mechanical and electrical connection between the conductors and the battery terminal post as well as between the conductors and the connector.

Another important purpose of the present invention is to provide a connector for a battery cable to a battery terminal post which is adapted to fit different sizes of battery terminal posts, and which connector can be easily fabricated with a minimum of expense as by casting from an alloy of copper such as bronze, and which will require little if any machining.

One aspect of the invention involves an electrical connector comprising an electrically conductive body member having a flat side, said body member being provided with an opening therein of generally rectangular transverse configuration having an axis substantially parallel to the flat side of such body member, said connector also including a flat bar integral with the body member that extends from the latter parallel to the axis of said opening, said bar having a flat side essentially coplanar with the flat side of the body member, a screw threaded in the body member and extending into the opening so as to be adapted for engaging an electric conductor therein, the principal transverse dimension of the opening and the extent of the screw being approximately parallel to the flat side of the body member, and said bar having an opening therethrough at a position spaced from the body member through which the connector is adapted to be bolted to the frame of a vehicle.

Another aspect of the invention involves an electrical connector clamp comprising an electrically conductive clamp body having a generally cylindrical concave surface, said clamp body including a pair of lateral extensions that are offset from and disposed on opposite sides of a cylinder defined by the concave surface of the clamp body, each of said extensions having an opening therethrough, a pair of opposed clamp members of electrically conductive material disposed between the extensions, each of said clamp members having a generally cylindrical concave surface facing toward the axis of a cylinder defined by the concave surface of the clamp body, said clamp members having integral lugs which are generally parallel to each other and which are provided with aligned openings, a bolt extending through the aligned openings that is provided with a nut for forcing the lugs toward each other, each of the clamp members having an ear extending through the opening in one of the extensions, said ears being inclined to the general parallelism of the lugs and in a direction inclined toward the center of said concave surface of the clamp body, whereby movement of the lugs toward each other cams the clamp members toward the center of a cylinder defined by the concave surface of the clamp body, and means carried by the clamp body for securing the latter to an electric cable.

Other refinements according to the invention involve the opening in the clamp body intersecting the concave surface of the clamp body, whereby the ends of electrical conductors extending through the opening can be bent to overlie portions of the concave surface of the clamp body so as to be in a position in the use of the clamping device to be forced into mechanical and electrical contact with the terminal post of a battery.

The principles of the invention will be best understood in the light of the following description taken in connection with the accompanying drawings, wherein.

Figure 1:
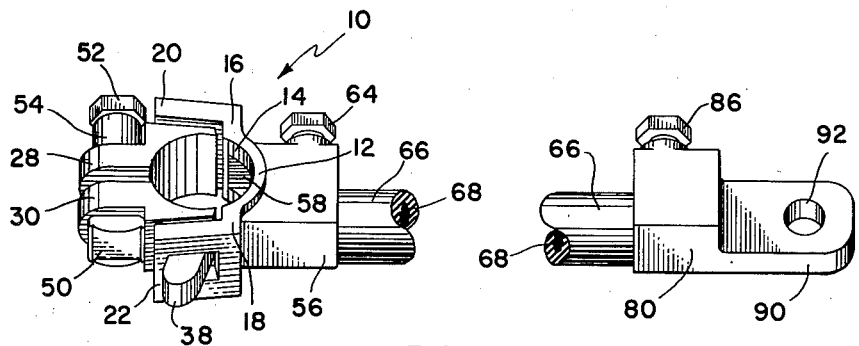
FIGURE 1 is an isometric view of an insulated electric cable provided with the connectors of this invention, the cable being shown broken.

Referring now to the drawings and in particular to the form of the invention shown in FIGURES 1, 2, 3 and 4, the numeral 10 designates generally the connector adapted to secure a battery cable to a battery terminal post. The connector 10 is comprised of a clamp body 12 having a generally cylindrically concave surface 14. The clamp body 12 is provided with offsets 16 and 18 at the opposite ends of the concave surface 14 that are provided with extensions 20 and 22 that are slightly divergent and spaced on the opposite sides of a cylinder defined by the concave surface 14. For a purpose to be explained presently, the extensions 20 and 22 are provided with openings 24 and 26.

A pair of clamp members are provided that are identical to each other and arranged in opposed relation between the extensions 20 and 22, such clamp members each comprising lugs 28 and 30 and which have generally cylindrical concave surfaces 32 and 34 that are complementary to a cylinder defined by the concave surface 14 of the clamp body 12. Additionally, the clamp members are respectively provided with outwardly extending fingers or ears 36 and 38 which extend respectively through the openings 24 and 26 in the extensions 20 and 22. The ears 36 and 38 are inclined to the general parallelism of the lugs 28 and 30 and are inclined in a direction toward the center of the concave surface 14.

The clamp members also are formed with shoulders 40 and 42, and the lugs 28 and 30 are connected by a bolt 44 that extends through aligned openings 46 and 48 in the lugs 28 and 30. The bolt 44 includes a square head 50 that seats against the shoulder 42 so as to prevent rotation of the bolt 44, and a polygonal nut 52 is threaded on the bolt 44, such nut 52 including a cylindrical portion 54 to afford clearance with the shoulder 40. By means of the bolt 44 and the nut 52, the lugs 28 and 30 can be forcibly urged toward each other with the coaction of the bolt 44 with the openings 46 and 48 being such as to retain the lugs 28 and 30 in general parallelism, it being noted that the bolt 44 otherwise freely extends through the openings 46 and 48 in the lugs 28 and 30.

The clamp body 12 includes as an integral part a projection 56 that extends in a direction opposite from the concave surface 14, such projection 56 being provided with an opening 58 therethrough that is generally rectangular in transverse configuration and which opening 58 intersects the concave surface 14 of the clamp body 12 as clearly shown in FIGURE 1. The projection 56 includes a lateral boss 60 and a threaded opening 62 is provided in the projection 56 that extends through the boss 60. A cap screw 64 is threaded in the opening 62 so as to extend into the opening 58.

The numeral 66 designates an insulated electric cable that includes a plurality of electrical conductors 68. The insulation of the cable 66 is stripped from one end of the cable 66 and the electrical conductors 68 extend entirely through the opening 58 with the end portions 70 of the electrical conductors 68 being spread apart somewhat and bent to overlie portions of the concave surface 14 as shown clearly in FIGURE 2. Also, as clearly shown in FIGURE 2, the cap screw 64 engages the electrical conductors 68 within the opening 58 in the projection 56. It will be noted that although the cable 66 is shown as being of cylindrical shape, and as being insulated, it is obvious, in view of the rectangular configuration of the opening 58, that the electric cable 66 can be of the woven rectangular type and in either case can or cannot be insulated. As will be seen presently, inclusion of the cap screw 64 for securing the electrical conductors 68 can, if desired, be omitted when the end portions 70 of the electrical conductors 68 are bent to overlie portions of the concave surface 14, however, it is preferred that the cap screw 64 be employed in the connector 10 in order to assure a more positive electrical and mechanical connection of the connector 10 to the electrical conductors 68.

Figure 2:
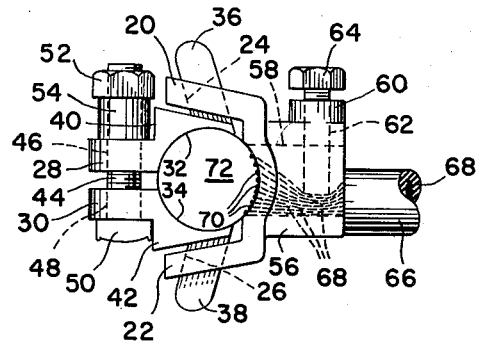
FIGURE 2 is a top plan view of the connector for the battery terminal post, the same being shown as applied to a battery terminal post.

The use of the connector 10 will be readily appreciated upon reference to FIGURE 2. The connector 10 is arranged with respect to a battery terminal post 72 in the manner shown in FIGURE 2 with the bent end portions 70 of the electrical conductors 68 being bent to overlie portions of the concave surface 14 and thereby be interposed between the battery terminal post 72 and the concave surface portion 14 of the clamp body 12, it being noted that some of the end portions 70 of the electrical conductors 68 can be bent downwardly and some bent upwardly as viewed in FIGURE 2. With the connector 10 and the electrical conductors 68 arranged with respect to the battery terminal post 72 as shown in FIGURE 2, the nut 52 is tightened to urge the lugs 28 and 30 toward each other. Such movement of the lugs 28 and 30 toward each other results in camming engagement of the ears 36 and 38 with the extensions 20 and 22 through the openings 24 and 26, it being obvious upon inspection of FIGURE 2 that such movement results in the clamp members being urged toward the axis of the axis of the cylinder defined by the concave surface 14. Such movement of the clamp members forces the concave surfaces 32 and 34 into clamping engagement with the battery terminal post 72 and urges the latter forcibly into contact wih the curved surface 14 of the clamp body 12 and with the bent portions 70 of the electrical conductors 68 arranged in between the battery terminal post 72 and the clamp body 12. Tightening of the nut 52 thereby forces engagement of the clamp body 12 and the clamp members into tight mechanical and electrical engagement with the battery terminal post 72, and also results in the electrical conductors 68 being pressed or forced into tight mechanical and electrical engagement with the battery terminal post 72 and with the clamp body 12. Such engagement of the electrical conductors 68 with both the battery terminal post 72 and the clamp body 12 assures mechanical connection of the electrical conductors 68 to the connector 10, whereby it will be seen that the cap screw 64 can be omitted, though it is preferred.

Battery terminal posts such as indicated at 72 are usually constituted of a malleable metal and the pressure exerted by the camming action between the ears 36 and 38 with the extensions 20 and 22 brings sufficient force to bear between the clamp body 12 and the battery terminal post 72 so as to result in the bent portions 70 of the electrical conductors 68 being somewhat imbedded in the battery terminal post 72 upon tightening of the nut 52 thereby enhancing a low resistance contact. The dimensions of the individual conductors 68 are such that imbedding of the latter in the battery terminal post 72 does not cause any material damage to the battery terminal post 72.

A very important advantage attained by the use of the connector 10 is that the latter can be very easily removed from a battery terminal post 72 upon loosening of the nut 52. Loosening of the nut 52 affords sufficient freedom of movement as between the two clamp members and the clamp body 12 so as to permit easy separation of such elements from the battery terminal post 72. Such removal ordinarily can be accomplished simply on loosening of the nut 52 with at most a slight tapping upon various portions of the connector 10 to afford a complete mechanical and electrical disconnection. It will be evident to those skilled in the art that the concave surfaces 14, 32 and 34 need not be strictly cylindrical in configuration, but if desired or deemed expedient, such surfaces (any or all) can be conformable to a cone of modest taper. It is intended that the use of the term "cylindrical" in the claims be so interpreted.

The connector 10 can be readily cast from an alloy of copper such as bronze and very little if any machining is required. If deemed necessary, the concave surfaces 14, 32 and 34 can be machined; however, it may be advantageous in certain circumstances that such surfaces possess the roughness inherent in cast articles to even further enhance the mechanical and electrical connection achieved by such surfaces with the battery terminal post 72. Of course, the elements thus far described are constituted or formed of a material of electrically conductive nature, and are preferably dimensioned or made of thicknesses such as to impart substantial rigidity thereto. The bolt 44, the nut 52 and the cap screw 64 may also be formed of alloys of copper, such as bronze; corrosion resistant materials such as stainless steel; or be conventional steel (plated with zinc or cadmium if deemed necessary). It will be obvious to those skilled in the art that the cap screw 64 has a blunt or smoothly rounded end (not shown) so that tightening the cap screw 64 does not result in damage to the electrical conductors 68.

While the surfaces 32 and 34 are shown as being complementary to the same cylindrical (or conical surface), it is not essential that the surfaces 32 and 34 have the same radius of curvature as that of the surface 14. Furthermore, surfaces 32 and 34 can have differing radii of curvature that are each different from that of the concave surface 14 as will be plain to those conversant with the art to which this invention pertains.

Attention is now directed to the connector shown in FIGURE 1 for attaching the end of the cable 68 remote from the connector 10 to a frame member of a vehicle (not shown). This connector comprises a body member 80 having an opening 82 extending therethrough. A cap screw 86 is threaded in an opening 88 in the body member 80 that intersects the opening 82, whereby the cap screw 86 can be tightened to engage the electrical conductors 68 of the cable 66 within the opening 82.

Figure 6:
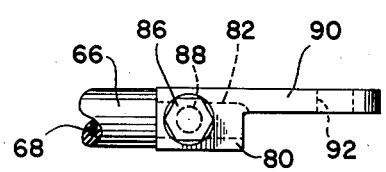
Figure 4:
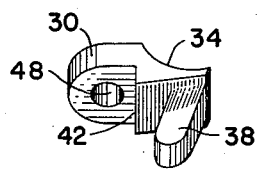
FIGURE 4 is an isometric view of one of the clamp members forming a part of the clamp shown in FIGURE 2.

The body member 80 has integral therewith a bar 90 that has a flat surface that is coplanar with a flat side of the body member 80, as clearly shown in FIGURES 1 and 6. The bar 90 is provided with an opening 92 situated remote from the body member 80, whereby the connector can be secured to a vehicle frame member (not shown) by a bolt (not shown) extending through the opening 92.

As will be apparent upon inspection of the drawings, the opening 82 is generally rectangular in transverse configuration and has an axis generally parallel to the flat side of the connector. Also, it will be observed that the extent of the cap screw 86 and the principal or major transverse dimension of the opening 82 lie in a plane parallel to such flat surface. As clearly shown in FIGURE 6, the screw 88 has a diameter constituting a major proportion of the minor transverse dimension of the opening 82 to enhance the engagement of the conductors 68 in the opening 82.

The connector shown in FIGURE 1 and FIGURE 6 are formed of the same class of materials indicated as suitable for the connector 10, and are of sufficient dimensions so as to be readily cast and possess substantial rigidity.

Figure 5:
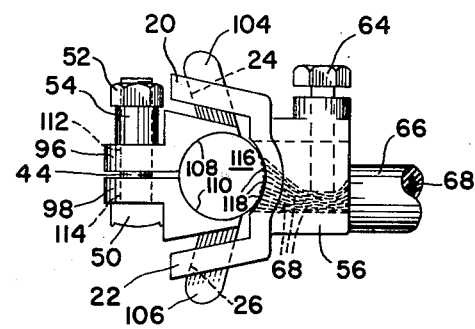
FIGURE 5 is a top plan view of a modified form of the clamp shown in FIGURE 2; and, FIGURE 6 is a top view of the connector shown in FIGURE 1 for connecting the battery cable to a frame member of a vehicle.
Figure 3:
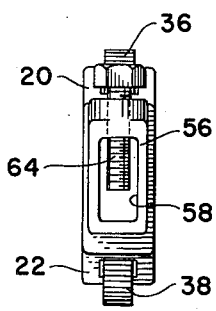
FIGURE 3 is an end view of the connector shown in FIGURE 2, the battery cable being removed.

As mentioned previously, the surfaces 32 and 34 of the clamp members shown in FIGURE 2 do not need necessarily to have the same radii of curvature as the concave surface 14 of the clamp body 12. While it is preferred that the connector 10 be designed to fit the most conventional size of battery terminal post, in which event all concave surfaces have curvatures complementary to such battery terminal post; it may happen that the battery terminal post with which the apparatus of the invention is to be used is of lesser radius of curvature than is the surface 14 of the clamp body 12. In this event, clamp members having concave surfaces of lesser radius of curvature can be employed with the clamp body 12, or alternatively, the radii of curvature of the concave surfaces of the clamp members can be greater than the radius of curvature of the concave surface 14 of the clamp body 12. As an example of this modified form of the invention, attention is now directed to FIGURE 5 wherein there is disclosed the same clamp body 12 as shown in FIGURES 1, 2, and 3, but the connector 10 is modified to the extent that the clamp members have concave surfaces that are of lesser radii than the concave surface 14 of the clamp member 12. Referring to FIGURE 5 the numerals 96 and 98 designate the lugs of the modified clamp members, such clamp members including shoulders 100 and 102 that are similar in purpose and function to the shoulders 40 and 42 shown in FIGURE 2. The clamping members include fingers or ears 104 and 106 and have concave surfaces 108 and 110 that are of lesser radius of curvature than that of the concave surface 14 of the clamp body 12. The lugs 96 and 98 are provided with aligned openings 96 and 98 for accommodating the bolt 44 and the nut 52 as shown.

The connector shown in FIGURE 5 is shown applied to a battery terminal post 116 that is of lesser diameter than the battery terminal post 72 shown in FIGURE 2. The electrical conductors 68 are associated with the connector shown in FIGURE 5 in a manner similar to that shown in the previously described embodiment of the invention, and the bent ends 118 of the electrical conductors 68 are spread and disposed between the battery terminal post 116 and the concave surface 14 of the clamp body 12 as shown in FIGURE 5. The operation of this modification of the invention is quite analogous to that previously described in connection with FIGURES 1, 2, 3 and 4; the nut 52 being tightened to force the clamp members into contact with the battery terminal post 116 due to the camming action of the ears 104 and 106 coacting with the extensions 20 and 22. Forcible engagement of the curved surfaces 108 and 110 into complementary engagement with the battery terminal post 116 forces the latter into secure mechanical and electrical contact with the bent ends 118 of the electrical conductors 68 and also into firm electrical and mechanical engagement with the curved surface 14 of the clamp body 12. While the concave surfaces 108 and 110 are shown as being of equal radii of curvature less than that of the radius of curvature of the surface 14 of the clamp body 12, it will be plain to those skilled in the art that the surfaces 108 and 110 need not be equal and instead of being of lesser radii of curvature than the surface 14 of the clamp body 12, they can be of greater radii of curvature to accommodate different size battery terminal parts. It also will be plain that the radii of curvature 108 and 110 need not be either equal to each other in which event the connector will have at least one clamp member or the clamp body conformable for surface area contact with a battery terminal post of any one of three different sizes. In this connection, the concave surfaces of either one or both of the clamp members may include portions having different radii of curvature as shown in one of the embodiments of my copending application. In connection with this latter modification, it will be apparent that a single clamp member can have concave surfaces that are complementary in at least a portion of their extent to either one of two different battery terminal posts of differing diameters.

In view of the foregoing, it will be seen that there have been provided connectors suitable for connection to a battery terminal post and also to a frame member of a vehicle which are extremely flexible in application. The connector 10 can be employed with different clamp members complementary to different size battery terminal posts, and it is contemplated that the connector 10 can be marketed with such an assortment of clamp members as may be deemed appropriate.

From the foregoing it is manifest that the illustrated and described embodiments of the invention are subject to many changes in detail without departing from the scope of the principles of the invention. The embodiments of the invention have been illustrated and described in elaborate detail solely to convey a full and complete understanding of the principles involved, and a restricted scope of invention is not to be thereby implied. Rather, the appended claims should be consulted to ascertain the actual scope of the invention.

I claim:

1. An electrical connector clamp comprising a clamp body of electrically conductive material having a generally cylindrical concave surface, said clamp body including a pair of lateral extensions that are offset from and disposed on opposite sides of a cylinder defined by the concave surface, each of said extensions having an opening therethrough, a pair of opposed clamp members of electrically conductive material disposed between the extensions, each of said clamp members having a generally cylindrical concave surface essentially complementary to a cylinder defined by the concave surface of the clamp body, said clamp members each having an integral lug which lugs are generally parallel to each other, means for forcibly urging the lugs toward each other, each of said clamp members having an ear extending through the opening in one of the extensions, said ears being inclined to the general parallelism of the lugs and in a direction inclined toward the center of said concave surface of the clamp body, whereby the movement of the lugs toward each other cams the clamp members toward the center of a cylinder defined by the concave surface of the clamp body through camming coaction of the ears and the extensions, and said clamp body having an opening therethrough that is generally perpendicular to the axis of a cylinder defined by the concave surface of the clamp body.

2. An electrical connector clamp comprising an electrically conductive clamp body having a generally cylindrical concave surface, said clamp body including a pair of lateral extensions that are offset from and disposed on opposite sides of a cylinder defined by the concave surface of the clamp body, each of said extensions having an opening therethrough, a pair of opposed clamp members of electrically conductive material disposed between the extensions, each of said clamp members having a generally cylindrical concave surface facing toward the axis of a cylinder defined by the concave surface of the clamp body, said clamp members each having an integral lug which lugs are generally parallel to each other and which are provided with aligned openings, a bolt extending through the aligned openings that is provided with a nut for forcing the lugs toward each other, each of the clamp members having an ear extending through the opening in one of the extensions, said ears being inclined to the general parallelism of the lugs and in a direction inclined toward the center of said concave surface of the clamp body, whereby movement of the lugs toward each other cams the clamp members toward the center of a cylinder defined by the concave surface of the clamp body, and means carried by the clamp body for securing the latter to an electric cable.

3. The combination of claim 2, wherein the radius of curvature of the concave surface of at least one of the clamp members is different from that of the concave surface of the clamp body.

4. The combination of claim 2, wherein the radii of curvature of the clamp members are equal.

5. The combination of claim 2, wherein the clamp members are identical with each having a shoulder, said bolt having a polygonal head with a side of such head engaging the shoulder of one of the clamp members to prevent rotation of the bolt, and said nut having a cylindrical portion affording clearance from the shoulder of the other clamp member.

6. The combination of claim 2, wherein the last-mentioned means comprises the clamp body having an opening therethrough that intersects the concave surface of the clamp body.

7. The combination of claim 6, including a screw threaded in the clamp body and intersecting with the last-mentioned opening for engaging an electrical conductor therein.

8. The combination of claim 2, wherein the last-mentioned means comprises the clamp body including a projection on the side thereof opposite the concave surface of the clamp body, said projection having a recess therein for receiving an electric conductor, and a screw threaded in the clamp body and extending into the recess.

9. The combination of claim 2, wherein the clamp body and the clamp members are metallic and include copper, and are substantially rigid.

References Cited in the file of this patent

UNITED STATES PATENTS

| | | |
|---|---|---|
| 2,161,249 | Dibner | June 6, 1939 |
| 2,313,927 | Dorfman | Mar. 16, 1943 |
| 2,730,691 | Nelson | Jan. 10, 1956 |
| 2,737,636 | Valentine et al. | Mar. 6, 1956 |
| 2,860,320 | Goodnight | Nov. 11, 1958 |
| 2,907,978 | Bergan | Oct. 6, 1959 |

FOREIGN PATENTS

| | | |
|---|---|---|
| 522,794 | Canada | Mar. 20, 1956 |
| 571,060 | Canada | Feb. 24, 1959 |